(12) United States Patent
Song et al.

(10) Patent No.: US 9,111,137 B2
(45) Date of Patent: Aug. 18, 2015

(54) APPARATUS AND METHOD FOR RECOGNIZING HAND SHAPE IN PORTABLE TERMINAL

(75) Inventors: Hee-Jun Song, Yongin-si (KR);
Jae-Han Yoon, Seongnam-si (KR);
Hyun-Sik Shim, Yongin-si (KR);
Young-Hee Park, Seoul (KR)

(73) Assignee: Samsung Electronics Co., Ltd, Suwon-Si (KR)

(*) Notice: Subject to any disclaimer, the term of this patent is extended or adjusted under 35 U.S.C. 154(b) by 1267 days.

(21) Appl. No.: 12/658,322

(22) Filed: Feb. 8, 2010

(65) Prior Publication Data

US 2010/0202693 A1 Aug. 12, 2010

(30) Foreign Application Priority Data

Feb. 9, 2009 (KR) .................. 10-2009-0010071

(51) Int. Cl.
*G06K 9/62* (2006.01)
*G06K 9/00* (2006.01)
*G06K 9/46* (2006.01)

(52) U.S. Cl.
CPC .......... *G06K 9/00375* (2013.01); *G06K 9/6256* (2013.01); *G06K 2009/4666* (2013.01)

(58) Field of Classification Search
None
See application file for complete search history.

(56) References Cited

U.S. PATENT DOCUMENTS

| 6,741,756 | B1* | 5/2004 | Toyama et al. | 382/291 |
| 7,050,607 | B2* | 5/2006 | Li et al. | 382/118 |
| 2008/0175516 | A1* | 7/2008 | Aradhye | 382/290 |
| 2009/0087028 | A1* | 4/2009 | Lacey et al. | 382/103 |
| 2011/0058060 | A1* | 3/2011 | Bigioi et al. | 348/222.1 |

FOREIGN PATENT DOCUMENTS

| KR | 1020060133345 A | 12/2006 |
| KR | 100755800 B1 | 8/2007 |
| KR | 1020080003617 A | 1/2008 |
| KR | 1020080065866 A | 7/2008 |

OTHER PUBLICATIONS

Notice of Preliminary Rejection dated Mar. 23, 2015 in connection with Korean Patent Application No,10-2009-0010071; 14 pages.
Fang, et al.; "Hand Posture Recognition with Co-Training"; Pattern Recognition; IEEE ICPR 2008; 4 pages.

* cited by examiner

*Primary Examiner* — Kim Vu
*Assistant Examiner* — Fred Hu

(57) ABSTRACT

A portable terminal is configured to recognize an image such as a hand shape. The portable terminal includes a motion detection unit that includes a trainer capable of generating uniform training image data to collectively generate a plurality of images of a desired region obtained from an original image in an identical posture and an identical size, and performing a training process to prevent a feature point from being generated in a portion where detection is unnecessary in the generated training image data, and a detector capable of detecting a rotated object from input data, after the training process.

21 Claims, 10 Drawing Sheets

APPARATUS AND METHOD FOR RECOGNIZING HAND SHAPE IN PORTABLE TERMINAL

CROSS-REFERENCE TO RELATED APPLICATION(S) AND CLAIM OF PRIORITY

The present application is related to and claims priority under 35 U.S.C. §119 of a Korean patent application filed in the Korean Intellectual Property Office on Feb. 9, 2009 and assigned Serial No. 10-2009-0010071, the entire disclosure of which is hereby incorporated by reference.

TECHNICAL FIELD OF THE INVENTION

The present invention relates generally to an apparatus and a method for detecting a specific hand shape and a specific hand motion in a portable terminal. More particularly, the present invention relates to a method and an apparatus, to collectively and conveniently generate a large number of training images and rotate a detector pattern for detection with respect to rotation when using an AdaBoost detector to detect a hand shape, thus able to match accuracy between images.

BACKGROUND OF THE INVENTION

Recently, as portable terminals have been drastically developed, portable terminals used especially for wireless voice calls and exchanges of information became necessities.

At the beginning of supplying of portable terminals, portable terminals are just recognized as portable tools just for wireless voice calls, but as their technologies are developed, and wireless Internet is introduced, the range of applications of portable terminals, such as games, watching of satellite broadcasting, remote controls using near field communications, imaging of built-in digital cameras, and schedule organizing as well as phone calls, is increased to satisfy users' demands.

Digital cameras form moving images of a moving subject as well as still images. Especially, portable imaging devices are widely used to photograph people.

When a portable terminal is used to photograph a person, a shutter should be accurately pressed just when a face is disposed on a screen. However, since positioning of a person is not easy, photographing a moving person can be difficult. To address this limitation, active research is recently being carried out on construction of a Human Computer Interaction (HCI) system for a facial expression recognition system and user recognition/adaptation. However, a face should be accurately detected to recognize expression, and accurate detection of a face from a still or moving image is difficult.

Faces having various sizes, beards, the presence of structures such as glasses, positions of faces, variations of illumination, characteristics of cameras, variations of facial expression make it difficult to detect faces. That is, a large number of training images for generating a detector model is necessary to perform the above functions, and a training process that requires a large number of processes to uniformly maintain positions of the training images is necessary.

Additionally, when angle variation is large in detecting a rotated face, detection processes at various angles should be repeated on a single input image.

The above limitations occur more frequently when detecting hand motions that have more position variations than those of facial regions.

Products having a function recognizing a hand motion in a portable terminal are recently commercialized, but improvement in the hand motion detection performance is required.

SUMMARY OF THE INVENTION

To address the above-discussed deficiencies of the prior art, it is a primary aspect of the present invention is to substantially solve at least the above problems and/or disadvantages and to provide at least the advantages below. Accordingly, an object of the present invention is to provide an apparatus and method for improving hand shape detection performance by using an Adaboost detector in a portable terminal.

Another aspect of the present invention is to provide an apparatus and method for improving a training process for detecting a hand shape in a portable terminal.

Yet another aspect of the present invention is to provide an apparatus and method for improving matching accuracy between images by rotating a detector pattern to perform a detection process with respect to rotation.

In accordance with an aspect of the present invention, an apparatus for recognizing a hand shape in a portable terminal includes: a trainer that generates uniform training image data to collectively generate a plurality of images of a desired region obtained from an original image in an identical posture and an identical size, and performs a training process to prevent a feature point from being generated in a portion where detection is unnecessary in the generated training image data; and a detector that detects a rotated object from input data, after the training process.

In accordance with another aspect of the present invention, a method for recognizing a hand shape in a portable terminal includes: generating uniform training image data to collectively generate a plurality of images of a desired region obtained from an original image in an identical posture and an identical size; performing a training process to prevent a feature point from being generated in a portion where detection is unnecessary in the generated training image data; and detecting a rotated object from input data, after the training process.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 9B, discussed below, and the various embodiments used to describe the principles of the present disclosure in this patent document are by way of illustration only and should not be construed in any way to limit the scope of the disclosure.

Hereinafter, a detection apparatus and a detection method according to embodiments of the present invention will now be described, which use an AdaBoost detector in a portable terminal to improve a training process of generating training image data for improving efficiency in detecting a hand shape, and rotates a pattern of the detector to perform a detection process with respect to rotation, thus improving matching accuracy between images.

Figure 1:
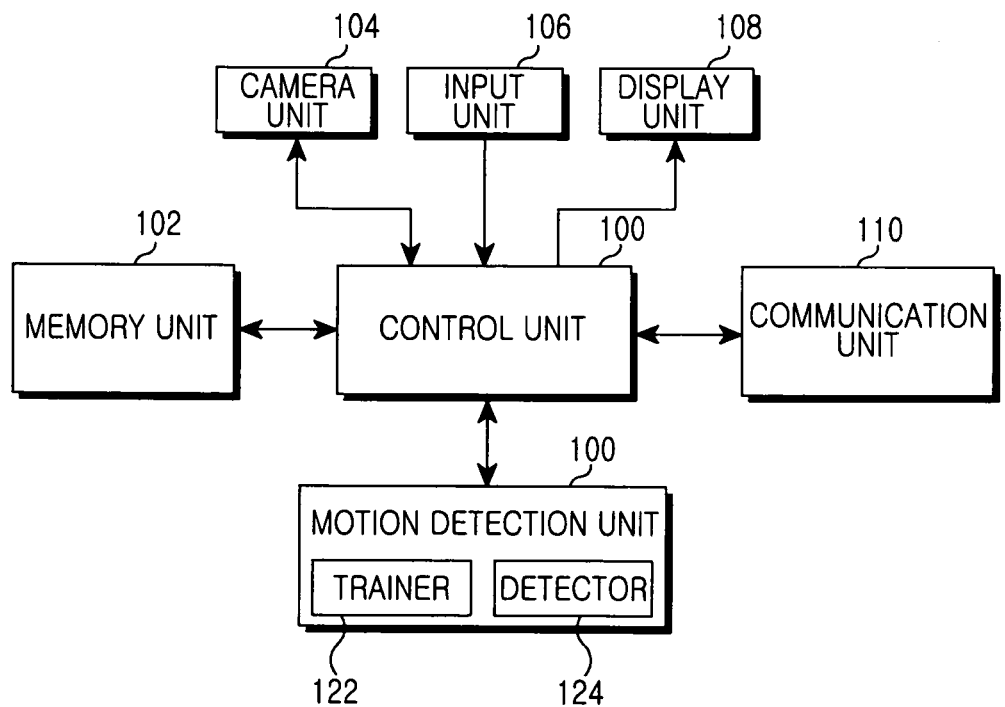
FIG. 1 illustrates a construction of a portable terminal for improving accuracy in detecting a hand shape according to an embodiment of the present invention.

FIG. 1 illustrates a construction of a portable terminal for improving accuracy in detecting a hand shape according to an embodiment of the present invention.

FIG. 1, the portable terminal may include a control unit 100, a memory unit 102, a camera unit 104, an input unit 106, a display unit 108, a communication unit 110, and a motion detection unit 120 that may include a trainer 122 and a detector 124.

The control unit 100 controls overall operation of the portable terminal. For example, the control unit 100 performs processes and controls for voice calls and data communications. In addition to a common function, according to the current embodiment, the control unit 100 controls generation of uniform training image data including a plurality of training images to generate a detector model for detecting a hand motion using the portable terminal. The uniform training image data generated by the control unit 100 is obtained by collectively generating images in a desired region obtained from an original image, in an identical posture and an identical size according to the current embodiment, instead of marking and cutting a predetermined region from an original image.

The control unit 100 obtains a feature point for detecting a hand motion from an input image, performs a Local Binary Pattern (LBP) conversion, and controls a detection process in which a rotation algorithm process is performed to rotate a detector pattern for detection with respect to rotation, thus improving matching accuracy between images. When the control unit 100 performs a detection process using a plurality of detector, the control unit 100 sets a detector detecting a specific object as a precedence detector, and determines detection order of the other detectors. That is, the control unit 100 mainly uses the detector set as the precedence detector to detect a hand motion.

The memory unit 102 may include a Read Only Memory (ROM), a Random Access Memory (RAM), and a flash ROM. The ROM stores various types of reference data and a microcode of a program to process and control the control unit 100 and the motion detection unit 120.

The RAM, which is a working memory of the control unit 100, stores temporary data generated when various programs are performed. The flash ROM stores a phonebook, outbox messages, and inbox messages.

The camera unit 104 receives still image data or moving image data. The input unit 106 includes a plurality of function keys such as digit buttons of '0' through '9', a menu button, a cancel (delete) button, a confirm button, a call button, an end button, an Internet connection button, navigation key buttons, a character input key, and the like. And the input unit 106 provides key input data corresponding to a key pushed by a user to the control unit 100.

The display unit 108 displays state information, a limited number of characters, a large number of still images, and a large number of moving images, which are generated during an operation of the portable terminal. A color Liquid Crystal Display (LCD) device may be used as the display unit 108. The display unit 108 may include a touch input device to be used as an input device of a touch input type portable terminal.

The communication unit 110 transmits and receives a wireless signal of data, which is input and output through an antenna (not shown). For example, when the communication unit 110 transmits data, the communication unit 110 performs channel coding and spreading processes on data to be transmitted, and then performs an RF process. When the communication unit 110 receives data, the communication unit 110 converts a received RF signal to a baseband signal, and performs dispreading and channel decoding processes on the baseband signal to restore the data.

The trainer 122 of the motion detection unit 120 receives a command of the control unit 100 and generates uniform training image data including a plurality of training images to generate a detector model for detecting a hand motion.

For example, the trainer 122 determines coordinates of feature points representing an object in all original images to generate a desired region list having the coordinates of the feature points, and determines rotation information through the coordinates and a simple calculation.

Thereafter, the trainer 122 collectively rotates the original images to dispose the original images in a predetermined direction to perform a rotation angle correction process in which a re-sizing operation is performed on the original images, so that the original images have a predetermined size.

The detector 124 of the motion detection unit 120 performs the LBP conversion just one time when detecting a hand motion. When detecting a hand motion with respect to another angle, the detector 124 simply finds an LBP value of each pixel from a LBP conversion table to match a desired angle, and change the angle of the detector to detect the hand motion.

Since it is rare that an object rotates through a large angle in an image of the next frame of a currently detected frame, the detector 124 determines detection order around a detector detecting a specific object by frequently operating the detector detecting the specific object. That is, when a desired object is detected by a $K^{th}$ detector, the $K^{th}$ detector may be operated more frequently. Thus, the detector determines detection order of the $K^{h}$ detector, a $K+1^{th}$ detector, a $K-1^{th}$ detector, a $K+2^{th}$ detector, and a $K-2^{th}$ detector to perform a detection process using the detection order.

Although the motion detection unit 120 may be controlled by the control unit 100 of the portable terminal, the motion detection unit 120 is separated from the control unit 100 for convenience in description in the current embodiment. However, the present invention is not limited thereto, and thus, it will be understood by those skilled in the art that various changes in form and details may be made therein without departing from the spirit and scope of the invention. For example, all the above elements may be controlled at the control unit 100.

As described above, the apparatus according to the embodiment of the present invention can improve the efficiency in detecting a hand shape using the AdaBoost detector in the portable terminal. Hereinafter, a training process and the detection method will now be described. In the training process, the apparatus according to the embodiment of the present invention is used to generate training image data, thus improving the efficiency in detecting a hand shape. In the detection method, a detector pattern is rotated to perform a detection process with respect to rotation, thus increasing matching accuracy between images.

Figure 2:
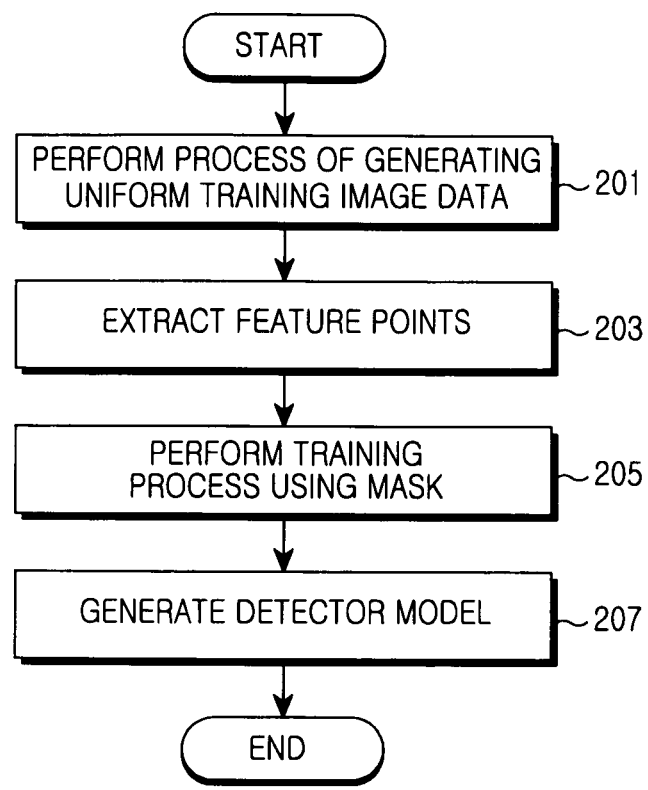
FIG. 2 illustrates of a training process to detect a hand motion in a portable terminal according to an embodiment of the present invention.

FIG. 2 illustrates a flowchart of a training process to detect a hand motion in a portable terminal according to an embodiment of the present invention.

FIG. 2, the portable terminal performs an operation related with the trainer to generate a trained model for detecting a hand motion.

First, the portable terminal generates uniform training image data in step 201.

In step 201, instead of marking and cutting a predetermined region from an original image with a plurality of training images to generate a detector model for detecting a hand motion, the uniform training image data is obtained by collectively generating images of a desired region obtained from an original image according to the current embodiment such that the images of the desired region have an identical posture and an identical size. A process of generating the uniform training image data will be described in detail with reference to FIG. 3.

In step 203, feature points corresponding to the hand motion are extracted by the portable terminal. In step 205, the training process is performed using a mask.

The training process using the mask is used to prevent a feature point from being generated in a portion where detection is unnecessary. In this case, when the portable terminal detects a hand motion, detection errors due to the image information of a background can be reduced. The training process using the mask will be described with reference to FIG. 4.

In step 207, the portable terminal generates a detector model for detecting the hand motion through the training process, and then ends the training process.

Figure 3:
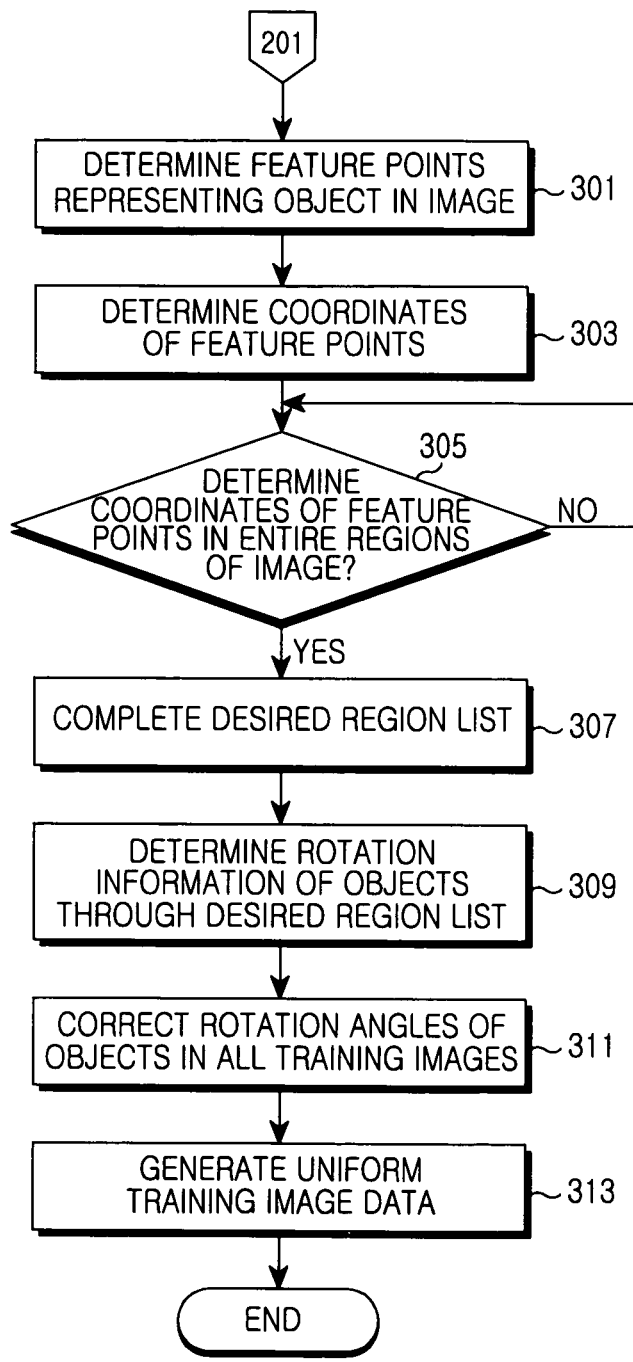
FIG. 3 illustrates of a process of generating uniform training image data in a portable terminal according to an embodiment of the present invention.

FIG. 3 illustrates a flowchart of the process of generating the uniform training image data in the portable terminal according to an embodiment of the present invention.

FIG. 3, in step 301, the portable terminal determines feature points representing an object in a training image to perform step 201 of FIG. 2.

In step 301, the feature points representing the object are points that express a hand motion. For example, when a hand motion forms a V-shape, end points of the two fingers and the center point between the two fingers may be feature points.

In step 303, the portable terminal determines the coordinates of the determined points. In step 305, the portable terminal determines whether the coordinates of all feature points of an original image are determined.

When the coordinates of all the feature points of the original image are not determined, the portable terminal performs step 301 again.

When the coordinates of the feature points of the original image are determined, the portable terminal completes a desired region list having the coordinates of the feature points in step 307.

In step 309, the portable terminal determines rotation information of objects through the desired region list. The rotation information includes the difference between an angle at which a user requires detection and a rotation angle of the original image, and the difference between a size at which a user requires detection and the size of a desired region in the original image. When setting the desired region, the portable terminal may determine the rotation information just using a simple trigonometric function and a calculation for the coordinates of the feature points.

In step 311, the portable terminal corrects rotation angles of the objects in all training images. In step 313, the portable terminal generates the uniform training image data.

The correction of the rotation angles of the objects in all the training images is collectively rotating the original images to dispose the original images in a predetermined direction, so that a re-sizing operation is performed on the original images, and the original images have a predetermined size. Accordingly, the portable terminal generates the uniform training image data that has balanced shape and size to be used in the trainer.

Then, the portable terminal ends the process of generating the uniform training image data.

Figure 4:
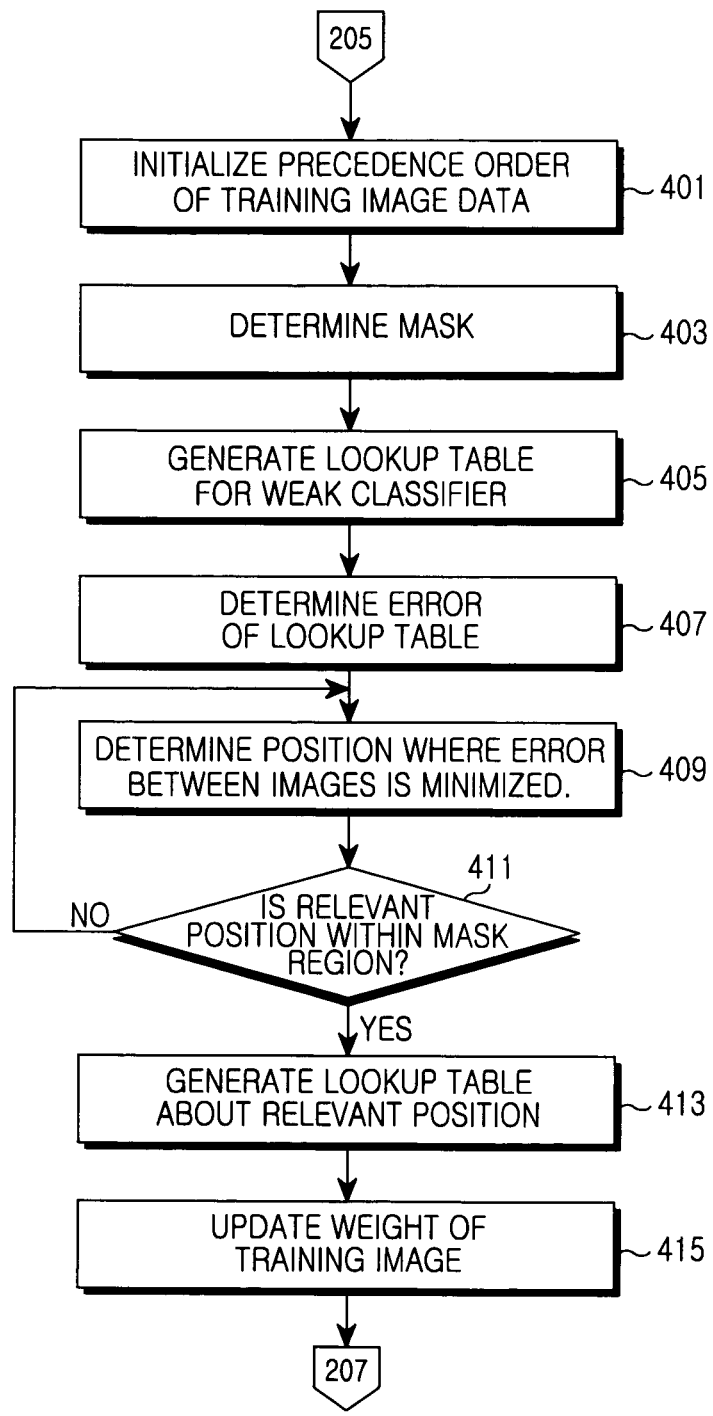
FIG. 4 illustrates of a training process for detecting a hand motion in a portable terminal according to an embodiment of the present invention.

FIG. 4 illustrates a flowchart of the training process for detecting the hand motion in the portable terminal according to an embodiment of the present invention.

FIG. 4, the portable terminal makes a training process of a related art AdaBoost simple, and uses the mask to train the detector model, thus improving the performance of the portable terminal. In step 401, the portable terminal initializes all weights of the training image data. In step 403, the portable terminal determines the mask.

The training image data includes a positive image set of the hand motion to be detected, and a negative image set except for the positive image set. The mask excludes a classifier of an undesirable pixel position on the training image when generating a lookup table for a weak classifier, so as to improve accuracy in detecting the hand shape.

In step 405, the portable terminal generates the lookup table for the weak classifier. In step 407, the portable terminal determines an error of the lookup table.

In step 409, the portable terminal determines a position where an error between the images is minimized. Since the generating of the lookup table is well known in the art, a description thereof will be omitted.

In step 411, the portable terminal determines whether the position where an error between the images is minimized is within a mask region.

In step 411, a region out of the mask region is excluded while generating the lookup table, to exclude a classifier of an undesirable pixel position on the training image.

That is, the portable terminal performs step 409 again when the portable terminal determines that the position where an error between the images is minimized is out of the mask region, in step 411.

When the portable terminal determines, in step 411, that the position where an error between the images is minimized is within the mask region, the portable terminal performs step 413 to generate a lookup table about the relevant position. In step 415, the portable terminal updates the weight of the training image data.

That is, at the start of the training process, the portable terminal reads a mask having a portion that is marked to be detected and that matches an image size of a sub window, to prevent a feature point from being generated in a portion where detection is unnecessary. Thus, when the detector is operated, a matching operation is not performed on unnecessary feature points. Accordingly, a strong classifier can be generated, which can prevent detection errors of the detector due to the image information of a background, and can improve the detection accuracy by detecting only a hand having a desired hand shape.

After the training process, the portable terminal performs step 207 of FIG. 2 to generate the detector model.

Figure 5A:
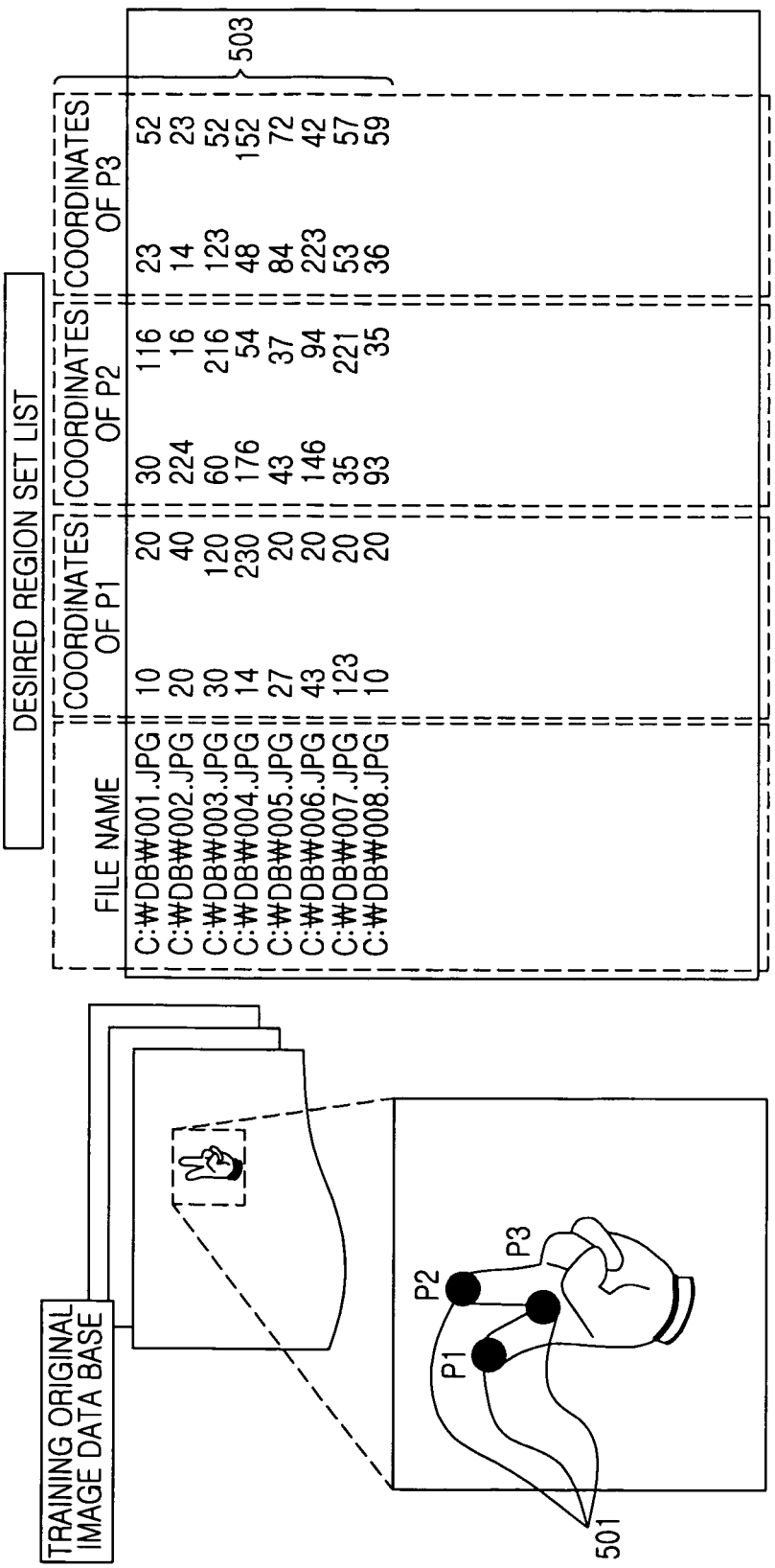
FIGS. 5A and 5B illustrate a schematic view of a process of generating uniform training image data in a portable terminal according to an embodiment of the present invention.
Figure 5B:
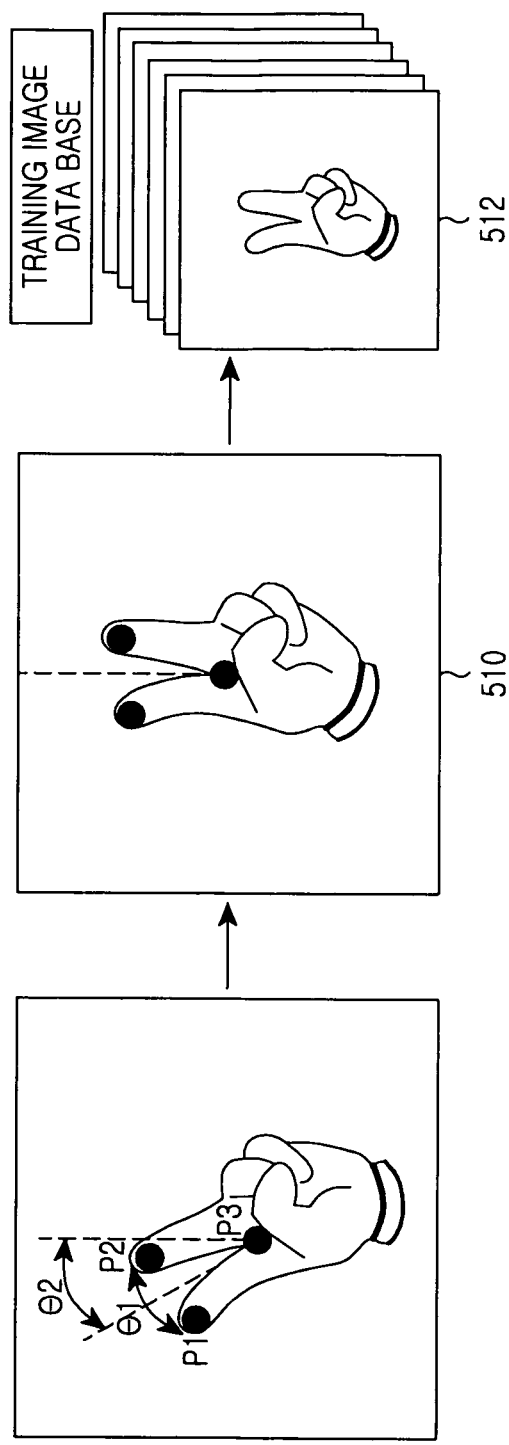

FIGS. 5A and 5B illustrate a schematic view of a process of generating uniform training image data in a portable terminal according to an embodiment of the present invention.

In FIGS. 5A and 5B, feature points representing an object from a training image of a training original image data base are determined. For example, when a hand motion forms a V-shape, end points of two fingers and the center point between the two fingers may be the feature points representing the object. In step 501, the portable terminal defines the feature points as P1, P2, and P3. In step 503, the portable terminal determines the coordinates of the feature points to generate a desired region set list. At this point, the portable terminal may determine rotation information based on the distance between P1 and P3 or the distance between P2 and P3.

In step 510, the portable terminal collectively rotates original images to dispose the original images in a predetermined direction. In step 512, the portable terminal performs a re-sizing operation on the original images such that the original images have a predetermined size. Thus, the uniform training image data that has balanced shape and size to be used in the trainer is generated.

Figure 6:
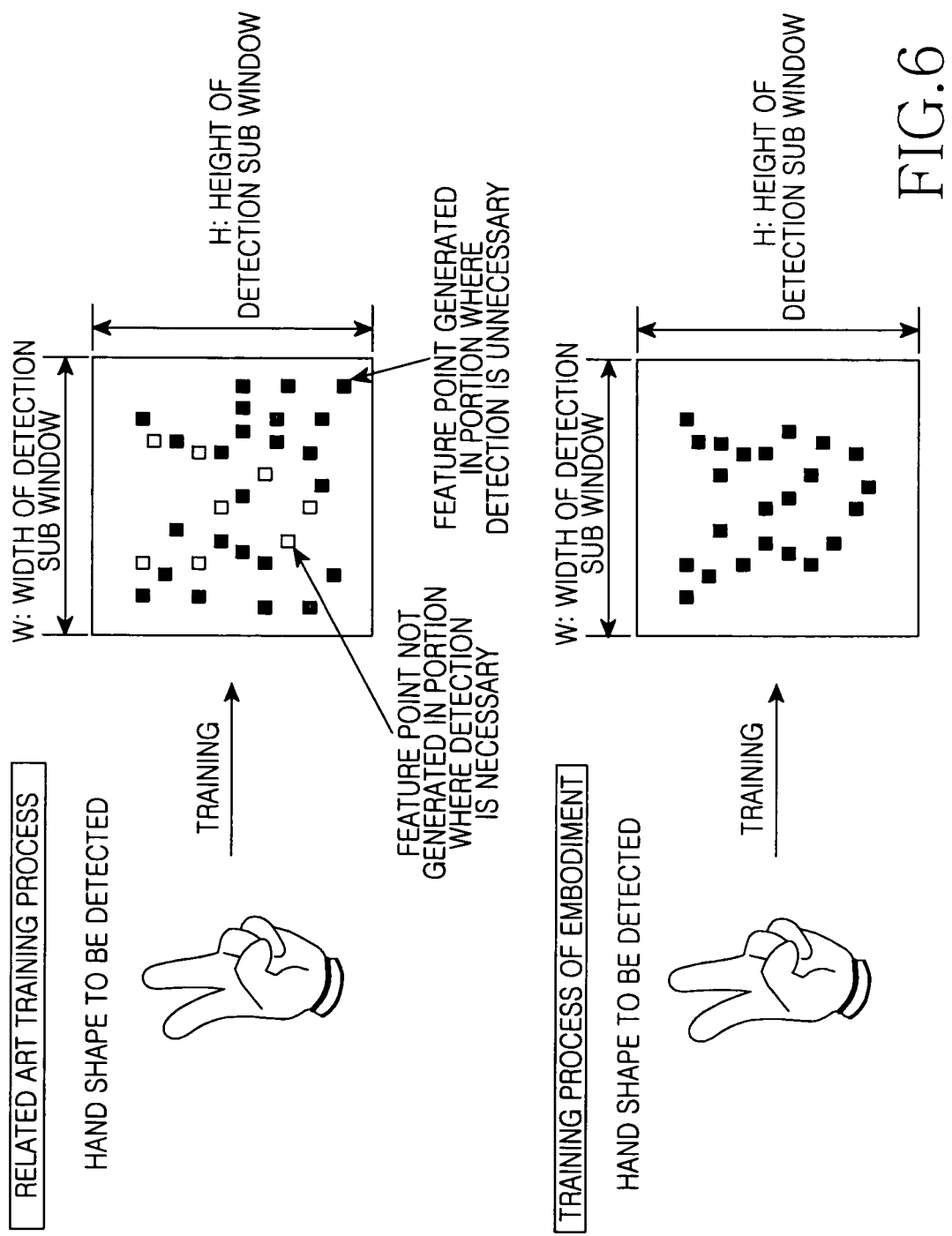
FIG. 6 illustrates a schematic view of a related art training process and a training process of a portable terminal according to an embodiment of the present invention.

FIG. 6 illustrates a schematic view of a related art training process and a training process of a portable terminal according to an embodiment of the present invention.

FIG. 6, in a related art detection method, when feature points in a portion out of an object to be detected, that is, out of a hand shape are selected, a portion having similar LBP characteristics in a background causes a detection error.

Since a part of a predetermined number of feature points is filled with the number of feature points disposed in the background during the related art training process, it is difficult to sufficiently obtain the feature of an actual detection region. Thus, a detection success rate is reduced.

In the training process according to the current embodiment, a mask including a marked portion that is detected and matches an image size of a sub window is read at the start of the training process to prevent a feature point from being generated in a portion without a mask region in detecting a feature point for achieving a minimum error, that is, in a portion where detection is unnecessary. Thus, when a detector is actually operated, a matching process is not performed on unnecessary feature points in the sub window. Accordingly, a detection error of the detector due to image information of the background is prevented, and only a hand having a desired hand shape is detected, so that a strong classifier capable of improving the detection accuracy can be generated.

Thus, the training process according to the current embodiment can improve the detection accuracy and the detection success rate.

Figure 7:
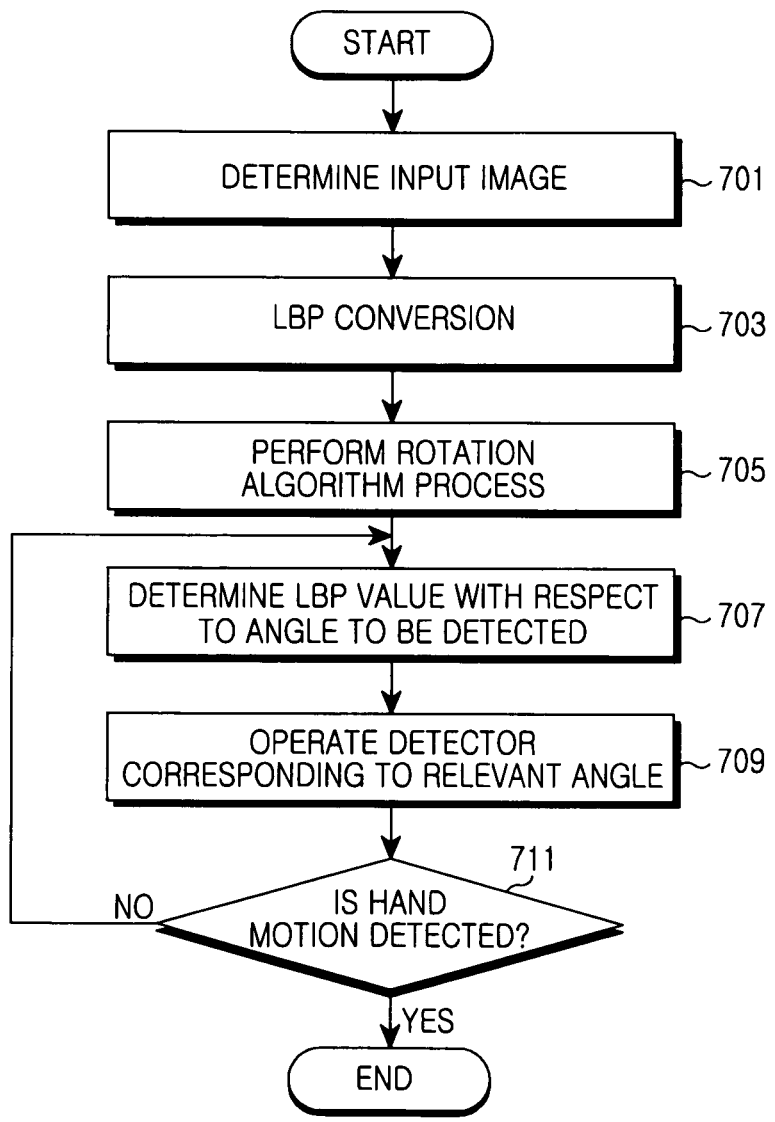
FIG. 7 illustrates of a process of detecting a hand motion in a portable terminal according to an embodiment of the present invention.

FIG. 7 illustrates a flowchart of a process of detecting a hand motion in a portable terminal according to an embodiment of the present invention.

FIG. 7, the portable terminal stores in advance LBP values respectively of rotations with respect to all values [0, 255] that an LBP conversion without rotation can have, in a table. When actually detecting the hand motion, the portable terminal performs the LBP conversion just one time. When detecting a hand motion with respect to another angle, the portable terminal simply finds the LBP value of each pixel from an LBP conversion table matching with a desired angle. In the current embodiment, the portable terminal detects an object rotating 45° clockwise. When reading order of conversion values is shifted by one bit unit, an LBP conversion value is obtained by rotating an original LBP conversion through 45°. Since the LBP conversion considers just peripheral eight pixels in the current embodiment, an angle conversion is performed just in a unit of 45°. However, a smaller angle unit may be applied to a conversion having a wider window range, or to a conversion having more precise angle variation.

First, in step 701, the portable terminal determines an input image. In step 703, the portable terminal performs an LBP conversion to obtain feature points for detecting the hand motion.

In step 705, the portable terminal performs a rotation algorithm process.

When the LBP conversion is performed just one time, and a hand motion is detected with respect to another angle, the rotation algorithm process is performed. The portable terminal stores in advance all values [0, 255] that an LBP conversion can have, determines a rotated LBP value with respect to each rotation, and then, operates a detector according to the rotated LBP value.

In step 707, the portable terminal performing the rotation algorithm process determines an LBP value with respect to an angle to be detected, from the table where all the values [0, 255] are stored in advance.

In step 709, the portable terminal operates a detector corresponding to the relevant angle.

In step 711, the portable terminal determines whether the hand motion is detected.

When the portable terminal determines that the hand motion is detected, the portable terminal ends the detection of the hand motion.

When detecting the hand motion, the portable terminal performs the LBP conversion just one time. When detecting a hand motion with respect to another angle, the portable terminal simply finds the LBP value of each pixel from an LBP conversion table matching with the desired angle, and then modifies the LBP value. Thus, calculations corresponding to the number of image pixels are just performed, so that the calculation speed is increased.

Figure 8:
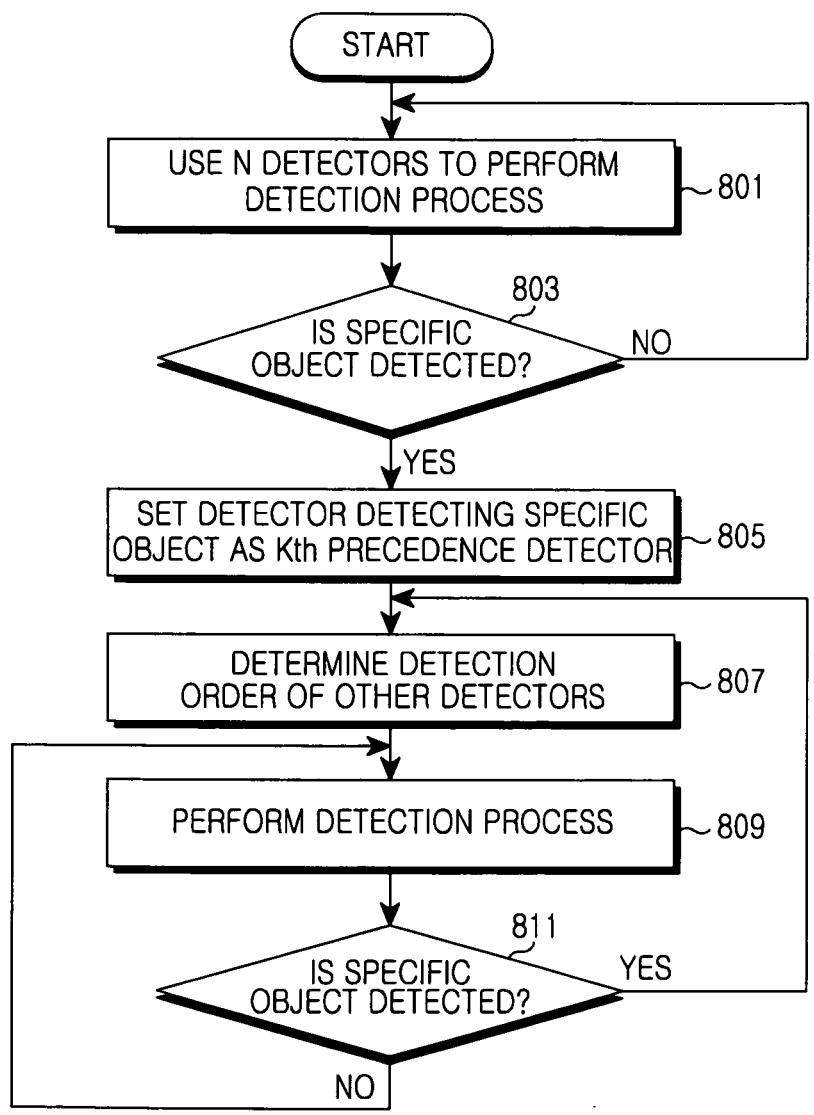
FIG. 8 illustrates of a detection process using a plurality of detectors in a portable terminal according to an embodiment of the present invention.

FIG. 8 illustrates a flowchart of a detection process using a plurality of detectors in a portable terminal according to an embodiment of the present invention.

FIG. 8, in step 801, the portable terminal uses N detectors to perform the detection process. In this case, the portable terminal includes the N detectors.

In step 803, the portable terminal determines whether a specific object is detected.

When the specific object is not detected, the portable terminal performs step 801 again.

That is, when the specific object is not detected, the portable terminal sequentially operates the 1 to $N^{th}$ detectors to detect the specific object.

When the portable terminal determines that the specific object is detected, the portable terminal performs step 805 to set the detector detecting the specific object as a precedence detector. In step 807, the portable terminal determines detection order of the other detectors.

When it is assumed that the portable terminal operates the detectors in real time, since it is rare that the object rotates through a large angle in the image of the next frame of a currently detected frame, the portable terminal frequently operates the detector detecting the specific object to determine the detection order in which the detector detecting the specific object is set as the precedence detector. That is, when a desired object is detected by the $K^{th}$ detector, the portable terminal may operate the $K^{th}$ detector more frequently. Thus, the portable terminal may determine detection order of the $K^{th}$ detector, the $K+1^{th}$ detector, the $K-1^{th}$ detector, the $K+2^{th}$ detector, and the $K-2^{th}$ detector.

For example, when the portable terminal detects a hand shape with fingers forming an upright V shape (at an angle of 0°), the detection is performed around 0° such as [0°→30°→0°→330°→0°→60°].

In step 809, the portable terminal performs the detection process in the detection order determined in step 807. In step 811, the portable terminal determines whether the specific object is detected.

When the portable terminal determines that the specific object is detected, the portable terminal performs step 807 to determine detection order of the other detectors around a newly detected angle.

When the portable terminal determines that the specific object is not detected, the portable terminal performs step 809 again.

Figure 9A:
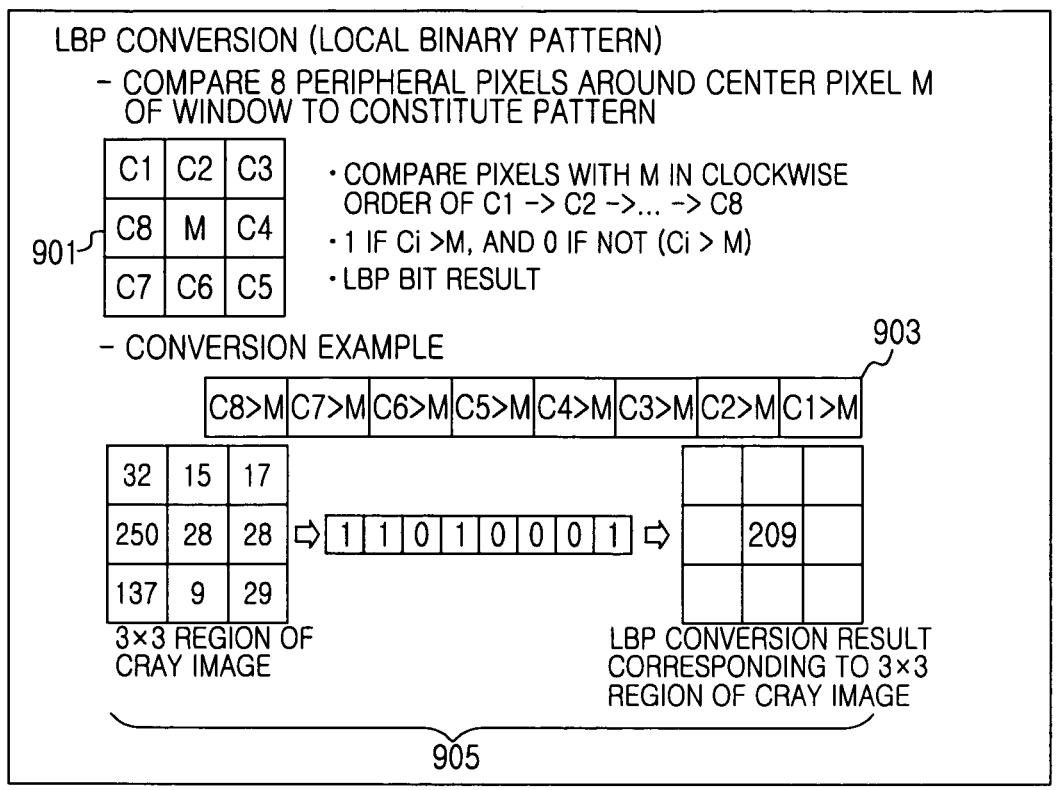
FIG. 9A illustrates a schematic view of an LBP conversion process in the related art.
Figure 9B:
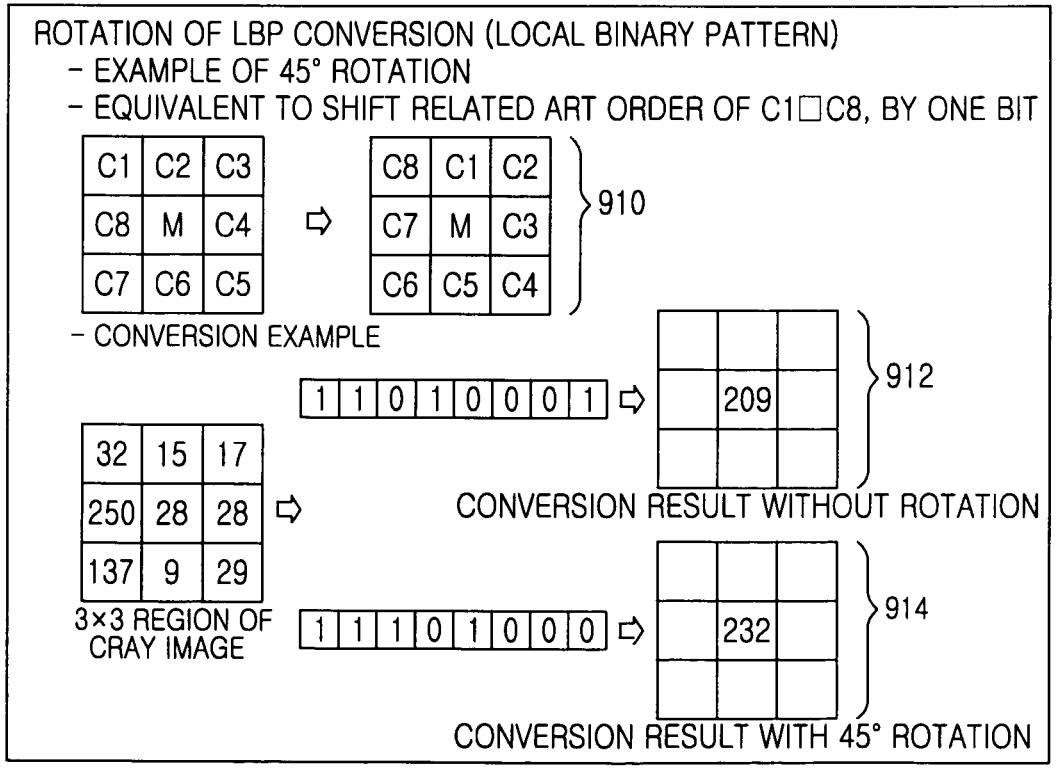
FIG. 9B illustrates a schematic view of an LBP conversion process performed on a rotated input image according to an embodiment of the present invention.

FIG. 9A illustrates a schematic view of an LBP conversion process in the related art. FIG. 9B illustrates a schematic view of a rotation algorithm in a portable terminal according to an embodiment of the present invention.

FIG. 9A, in the LBP conversion process, the center pixel of a 3×3 region is used as a critical value in step 901, it is determined whether the peripheral values are greater or less than the critical value in step 903, and the peripheral values are expressed as binary values in step 905. In the case where the LBP conversion is used for obtaining a detector model used to detect a rotated object, even when a matching process is actually performed along detectors on an input image, an input image rotated to match a desired rotation angle should be used.

However, in the case where a plurality of detectors are used to detect an object that may be displayed at a plurality of angles on an input image, when an LBP conversion is performed each time on the entire input image, a considerable load may be applied to a system, and it is not guaranteed that the detection is performed in real time.

FIG. 9B, an LBP conversion process is performed on a rotated input image.

In the LBP conversion process on the rotated input image, instead of rotating an input image to match a rotation angle of a detector, only an LBP conversion value of each pixel in the input image, considering the rotation angle, is simply found from a lookup table, so that the same effect as that obtained when an entire image is rotated is obtained within short execution time.

First, when an object rotated about 45° clockwise is detected, pixels of a 3×3 region are rotated about 45°, in other words, reading order of conversion values is shifted by one bit unit in step 910, and then, the values of peripheral pixels are compared to determine an LBP conversion value of the object rotated 45°.

When the pixels of the 3×3 region are not rotated, a related art LBP conversion result is obtained. When the pixels of the 3×3 region are rotated, an LBP result according to the rotation is determined from predetermined values of LBP conversion to determine a rotation angle.

As described above, the present invention collectively generates training image data having an identical posture and an identical size, from a plurality of images in a desired region obtained from an original image, and performs the training process to prevent a feature point from being generated in an undesired region. Thus, a large number of training images can be obtained, the effect of a background can be reduced, and more feature points in a desired region are considered to improve the accuracy of a detector and reduce detection errors.

A detector model pattern is rotated for detection with respect to rotation, and operation order of detector according to an angle is controlled to achieve real-time detection and improve detection performance.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An apparatus capable of recognizing a hand shape in a portable terminal, the apparatus comprising:
   a memory unit; and
   a controller configured to:
      generate uniform training image data to collectively generate a plurality of images of a desired region obtained from an original image in an identical or similar posture and an identical or similar size;
      perform a training process including setting masks in the training image data to generate a classifier lookup table for a weak classifier, determine a position where an error between the images is reduced, and then, generate a position lookup table about the position only when the position is within at least one of the masks, so as to perform the training process to prevent a feature point from being generated in a portion where detection is unnecessary in the generated training image data; and
      detect a rotated object from input data after the training process.

2. The apparatus of claim 1, wherein the controller is further configured to determine coordinates of feature points representing objects in the plurality of images to determine rotation information of the objects, and collectively correct the objects of the plurality of images to generate the uniform training image data.

3. The apparatus of claim 2, wherein the controller is further configured to collectively rotate original images to dispose the original images in a predetermined direction, and perform a re-sizing operation on the original images such that the original images have a predetermined size, so as to collectively correct the objects of the plurality of images.

4. The apparatus of claim 1, wherein the controller is configured to perform a detection process of rotating a detector according to an angle of the rotated object, and at least one of a plurality of detection processes determining precedence order of a plurality of detectors to detect the rotated object from the input data.

5. The apparatus of claim 4, wherein the controller is configured to perform a Local Binary Pattern (LBP) conversion when detecting a hand motion, and then, find, when performing a detection process with respect to another angle, an LBP value of each pixel matching a desired angle, from an LBP conversion table to modify an angle of the detector, so as to rotate the detector according to the angle of the rotated object.

6. The apparatus of claim 4, wherein the controller is configured to determine a detection order of other detectors around the detector detecting a hand motion when sequentially operating the detectors to detect the hand motion, and then, operate the other detectors in the detection order, so as to determine the precedence order of the other detectors.

7. The apparatus of claim 6, wherein the controller is configured to set the detector detecting the hand motion as a $K^{th}$ detector, and set precedence order of the other detectors around the $K^{th}$ detector to determine the detection order of the other detectors, and
wherein the precedence order of the other detectors is set as the $K^{th}$ detector, a $K+1^{th}$ detector, a $K-1^{th}$ detector, a $K+2^{th}$ detector, and then, a $K-2^{th}$ detector.

8. A method for recognizing a hand shape in a portable terminal, the method comprising:
generating uniform training image data to collectively generate a plurality of images of a desired region obtained from an original image in an identical or similar posture and an identical or similar size;
performing, using a controller, a training process including setting masks in the training image data, generating a classifier lookup table for a weak classifier to determine a position where an error between the images is reduced, and generating a position lookup table about the position only when the position is within at least one of the masks to prevent a feature point from being generated in a portion where detection is unnecessary in the generated training image data; and
detecting a rotated object from input data, after the training process.

9. The method of claim 8, wherein the generating of the uniform training image data comprises:
determining coordinates of feature points representing objects in the plurality of images;
using the coordinates of the feature points to determine rotation information of the object; and
collectively correcting the objects of the plurality of images.

10. The method of claim 9, wherein the collectively correcting of the objects of the plurality of image comprises:
collectively rotating original images to dispose the original images in a predetermined direction; and
performing a re-sizing operation on the original images such that the original images have a predetermined size.

11. The method of claim 8, wherein the detecting of the rotated object from the input data comprises:
a detection process of rotating the detector according to an angle of the rotated object; and
a detection process of determining precedence order of a plurality of detectors.

12. The method of claim 11, wherein the detection process of rotating the detector according to the angle of the rotated object comprises:
performing a Local Binary Pattern (LBP) conversion when detecting a hand motion; and
finding, when performing a detection process with respect to another angle, an LBP value of each pixel matching a desired angle, from an LBP conversion table to modify an angle of the detector.

13. The method of claim 11, wherein the detection process of determining the precedence order of the detectors comprises:
sequentially operating the detectors to detect a hand motion;
determining a detection order of other detectors around the detector detecting the hand motion; and
operating the other detectors in the detection order.

14. The method of claim 13, wherein the determining of the detection order of the other detectors comprises:
setting the detector detecting the hand motion as a $K^{th}$ detector; and
setting precedence order of the other detectors around the $K^{th}$ detector,
wherein the precedence order of the other detectors is set as the $K^{th}$ detector, a $K+1^{th}$ detector, a $K-1^{th}$ detector, a $K+2^{th}$ detector, and then, a $K-2^{th}$ detector.

15. A portable terminal capable of recognizing an image, the portable terminal comprising:
a control unit;
a display unit coupled to the control unit; and
a motion detection unit coupled to the control unit, the motion detection unit comprising:
a trainer configured to generate uniform training image data to collectively generate a plurality of images of a desired region obtained from an original image in an identical or similar posture and an identical or similar size; and perform a training process including setting masks in the training image data to generate a classifier lookup table for a weak classifier, determine a position where an error between the images is reduced, and then, generate a position lookup table about the position only when the position is within the at least one of the masks, so as to perform the training process to prevent a feature point from being generated in a portion where detection is unnecessary in the generated training image data; and
a detector configured to detect a rotated object from input data after the training process.

16. The portable terminal of claim 15, wherein the trainer is further configured to determine coordinates of feature points representing objects in the plurality of images to determine rotation information of the objects, and collectively correct the objects of the plurality of images to generate the uniform training image data.

17. The portable terminal of claim 16, wherein the trainer is further configured to collectively rotate original images to dispose the original images in a predetermined direction, and perform a re-sizing operation on the original images such that the original images have a predetermined size, so as to collectively correct the objects of the plurality of images.

18. The portable terminal of claim 15, wherein the detector further is configured to perform a detection process of rotating the detector according to an angle of the rotated object, and at least one of a plurality of detection processes determining precedence order of a plurality of detectors to detect the rotated object from the input data.

19. The portable terminal of claim 18, wherein the detector further is configured to perform a Local Binary Pattern (LBP) conversion when detecting a hand motion, and then, find, when performing a detection process with respect to another angle, an LBP value of each pixel matching a desired angle, from an LBP conversion table to modify an angle of the detector, so as to rotate the detector according to the angle of the rotated object.

20. The portable terminal of claim 18, wherein the detector further is configured to determine a detection order of other detectors around the detector detecting a hand motion when sequentially operating the detectors to detect the hand motion, and then, operate the other detectors in the detection order, so as to determine the precedence order of the other detectors.

21. The portable terminal of claim 20, wherein the detector further is configured to set the detector detecting the hand motion as a $K^{th}$ detector, and set precedence order of the other detectors around the $K^{th}$ detector to determine the detection order of the other detectors, and wherein the precedence order of the other detectors is set as the $K^{th}$ detector, a $K+1^{th}$ detector, a $K-1^{th}$ detector, a $K+2^{th}$ detector, and then, a $K-2^{th}$ detector.

* * * * *